(12) United States Patent
Xia

(10) Patent No.: US 10,221,670 B2
(45) Date of Patent: *Mar. 5, 2019

(54) TREATMENT OF PRODUCED WATER WITH SEEDED EVAPORATOR

(71) Applicant: BL Technologies, Inc., Minnetonka, MN (US)

(72) Inventor: Jiyang Xia, Shanghai (CN)

(73) Assignee: BL TECHNOLOGIES, INC., Minnetonka, MN (US)

( * ) Notice: Subject to any disclaimer, the term of this patent is extended or adjusted under 35 U.S.C. 154(b) by 666 days.

This patent is subject to a terminal disclaimer.

(21) Appl. No.: 14/428,138

(22) PCT Filed: Aug. 19, 2013

(86) PCT No.: PCT/US2013/055544
§ 371 (c)(1),
(2) Date: Mar. 13, 2015

(87) PCT Pub. No.: WO2014/042824
PCT Pub. Date: Mar. 20, 2014

(65) Prior Publication Data
US 2015/0292314 A1   Oct. 15, 2015
US 2019/0024492 A9   Jan. 24, 2019

Related U.S. Application Data

(60) Provisional application No. 61/700,645, filed on Sep. 13, 2012.

(30) Foreign Application Priority Data

Oct. 31, 2012   (CA) .................................... 2794356

(51) Int. Cl.
*C02F 1/04* (2006.01)
*C02F 1/26* (2006.01)
(Continued)

(52) U.S. Cl.
CPC ............... *E21B 43/40* (2013.01); *C02F 9/00* (2013.01); *E21B 43/24* (2013.01);
(Continued)

(58) Field of Classification Search
CPC ...... E21B 43/40; E21B 43/24; E21B 43/2408; E21B 43/34; C02F 9/00; C02F 1/048;
(Continued)

(56) References Cited

U.S. PATENT DOCUMENTS 6,675,747 B1 *  1/2004  Goidich ............... F22B 29/062
                                                              122/1 B
7,789,159 B1 *  9/2010  Bader .................... B01D 61/04
                                                              166/279

(Continued)

FOREIGN PATENT DOCUMENTS

CA       2509309 A1    12/2005
CN     101801513 A      8/2010
(Continued)

OTHER PUBLICATIONS

Treatment of produced water with seeded evaporator (1505). Retrieved from https://dialog.proquest.com/professional/docview/1684578067?accountid=161361 (Year: 2015).*

(Continued)

*Primary Examiner* — Jennifer H Gay

(57) ABSTRACT

Produced water, for example from a steam assisted gravity drainage (SAGD) or cyclic steam stimulation (CSS) heavy oil recovery operation, is treated to recover water that is re-used to create steam. The produced water is treated in one or more thermal treatment devices such as an evaporator and a crystallizer. The thermal treatment device is seeded, for example with a calcium or magnesium salt. The thermal treatment device produces a blowdown or slurry comprising super-saturated solids and organic compounds. A solvent is
(Continued)

added to the blowdown or slurry. The solids precipitate and are separated from the blowdown or slurry. The solvent may be recovered for re-use in treating more blowdown or slurry.

22 Claims, 1 Drawing Sheet

(51) Int. Cl.
| | |
|---|---|
| C02F 1/40 | (2006.01) |
| C02F 1/52 | (2006.01) |
| C02F 1/72 | (2006.01) |
| C02F 9/00 | (2006.01) |
| E21B 43/24 | (2006.01) |
| E21B 43/40 | (2006.01) |
| C02F 101/32 | (2006.01) |
| C02F 103/10 | (2006.01) |

(52) U.S. Cl.
CPC .......... *E21B 43/2408* (2013.01); *C02F 1/048* (2013.01); *C02F 1/26* (2013.01); *C02F 1/40* (2013.01); *C02F 1/52* (2013.01); *C02F 1/72* (2013.01); *C02F 2001/5218* (2013.01); *C02F 2101/32* (2013.01); *C02F 2103/10* (2013.01)

(58) Field of Classification Search
CPC ...... C02F 1/26; C02F 1/52; C02F 1/72; C02F 2001/5218
See application file for complete search history.

(56) References Cited

U.S. PATENT DOCUMENTS

| | | | | |
|---|---|---|---|---|
| 8,506,467 | B2* | 8/2013 | Minnich | E21B 43/2406 588/252 |
| 2005/0022989 | A1* | 2/2005 | Heins | E21B 43/2406 166/272.3 |
| 2005/0279500 | A1* | 12/2005 | Heins | C02F 1/04 166/266 |
| 2006/0032630 | A1* | 2/2006 | Heins | C02F 1/04 166/266 |
| 2007/0051513 | A1* | 3/2007 | Heins | E21B 43/24 166/265 |
| 2008/0110630 | A1* | 5/2008 | Minnich | C02F 1/04 166/303 |
| 2009/0008334 | A1 | 1/2009 | Schoen et al. | |
| 2009/0255673 | A1 | 10/2009 | Minnich et al. | |
| 2010/0038081 | A1* | 2/2010 | Gamache | C02F 1/5245 166/267 |
| 2011/0104038 | A1 | 5/2011 | Ditommaso et al. | |
| 2012/0000642 | A1 | 1/2012 | Betzer Tsilevich | |
| 2012/0097609 | A1* | 4/2012 | Xia | C02F 9/00 210/638 |
| 2012/0325743 | A1 | 12/2012 | Xia et al. | |
| 2014/0083706 | A1* | 3/2014 | Scott | F22B 37/26 166/305.1 |
| 2015/0252658 | A1* | 9/2015 | Xia | C02F 9/00 166/303 |
| 2015/0259232 | A1* | 9/2015 | Xia | C02F 9/00 166/267 |
| 2015/0292314 | A1* | 10/2015 | Xia | C02F 9/00 166/266 |

FOREIGN PATENT DOCUMENTS

| | | |
|---|---|---|
| CN | 101835954 A | 9/2010 |
| CN | 101835957 A | 9/2010 |
| CN | 102190380 A | 9/2011 |
| CN | 102452700 A | 5/2012 |
| CN | 102574022 A | 7/2012 |
| RU | 2 215 871 C2 | 11/2003 |
| WO | 2009029653 A1 | 3/2009 |

OTHER PUBLICATIONS

Office Action and Search issued in connection with corresponding RU Application No. 2015107263 dated Apr. 26, 2017.
Unofficial English Translation of Chinese Office Action issued in connection with corresponding CN Application No. 201380047908.1 dated Jul. 5, 2016.
W. Heins et. al.: "Acheiving Zero Liquid Discharge in SAGD Heavy Oil Recovery", Journal of Canadian Petroleum Technology, vol. 43, No. 8, Feb. 2, 2011, XP055097486, ISSN: 0021 *9487, DOI: 10.2118/04/08/01.
Maoz Betzer: "Steamdrive Direct Contact Steam Generation for SAGD", Proceedings of Canadian Unconventional Resources Conference, Jan. 1, 2011, XP055097390, DOI: 10.2118/148698-MS, ISBN: 978-1-61-399149-7.
International Search Report and Written Opinion issued in connection with corresponding PCT application PCT/US2013/055544 dated Jan. 30, 2014.
Canadian Patent Application No. CA2794356, Office Action dated Oct. 23, 2017.
Chinese Patent Application No. 201380047908.1, Office Action dated Nov. 15, 2017—English Translation not Available.
Chinese Patent Application No. 201380047908.1, Office Action dated May 15, 2018—English translation not available.

\* cited by examiner

TREATMENT OF PRODUCED WATER WITH SEEDED EVAPORATOR

FIELD OF THE INVENTION

This specification relates to a method and apparatus for treating water, for example produced water.

BACKGROUND

Canadian Patent 2 509 309 by Heins, entitled Water Treatment Method for Heavy Oil Production Using Calcium Sulfate Seed Slurry Evaporation, describes an evaporator based method of treating produced water from heavy oil production. Produced water is first treated in a de-oiling step to reduce oil and grease to about 20 parts per million or less. De-oiled water is introduced into an evaporator to produce a distillate and an evaporator blowdown containing concentrated residual solids. The distillate is used, optionally after further polishing, to create steam in a once-through steam generator or other boiler. The evaporator blowdown may be further treated in a crystallizer.

SUMMARY

The following summary is intended to introduce the reader to the detailed description to follow and not to limit or define the claimed invention.

Evaporator blowdown may require treatment to remove silica and/or other contaminants before it can be disposed or re-used. A crystallizer, for example, ordinarily treats evaporator blowdown to recover water and produce dry, or easily dried, crystals made up of solids precipitated from the blowdown. However, when a crystallizer is used to treat produced water, particularly produced water from heavy oil production, the crystallizer may instead produce a slurry. The slurry contains salts, for example silica salts, at concentrations above their ordinary limits of solubility in water and yet the solids are not crystallized and cannot be easily separated from the slurry. Concentrated organic compounds from the produced water remaining in the slurry may interfere with crystal growth and precipitation even for over saturated salts in the slurry.

In a method and apparatus described in this specification, a source of ions, for example magnesium or calcium ions, is added to the evaporator. A solvent, for example diisopropylamine (DIPA), isopropylamine (IPA), methanol or alcohol, is added to the blowdown. The solvent is later recovered from the solvent-blowdown mixture. Solids are separated from the blowdown before or after the solvent is recovered. Optionally, the blowdown may be further concentrated, for example in a crystallizer, before the solvent is added. Optionally, treated blowdown may be returned to the evaporator.

The method and apparatus are useful, for example, in providing an alternative means of treating produced water, or other water containing dissolved salts and organic compounds. The method and apparatus may be incorporated into a method and apparatus for extracting heavy oil.

DETAILED DESCRIPTION

Figure 1:
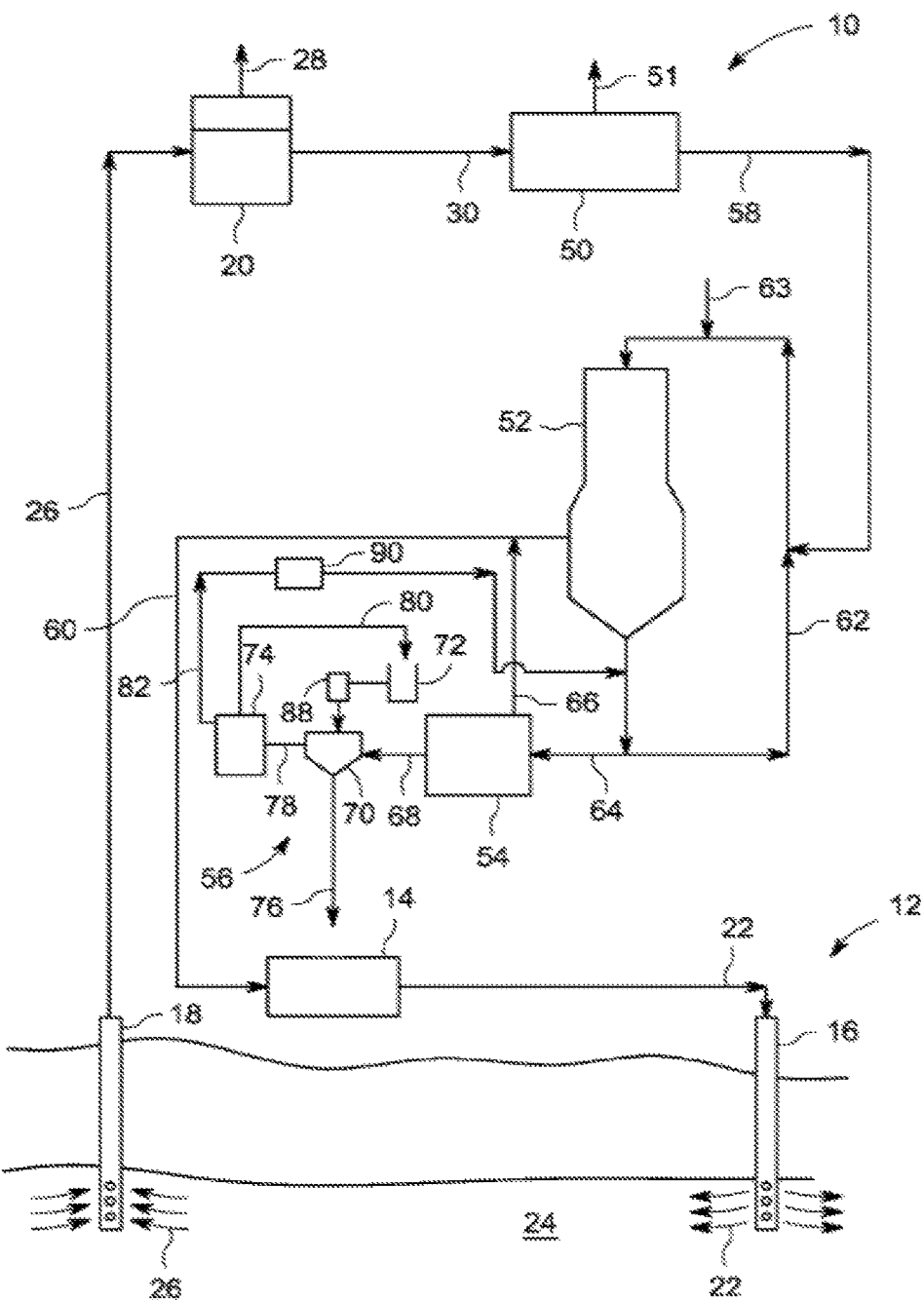
FIG. 1 is a schematic process flow diagram of a produced water treatment system combined with a heavy oil extraction system.

FIG. 1 shows a water treatment system 10 in combination with a heavy oil, for example bitumen, recovery system 12.

The heavy oil recovery system 12 has a boiler 14, an injection well 16, a production well 18 and an oil-water separator 20. The boiler 14 may be, for example, a once through steam generator (OTSG) or a packaged boiler. The boiler 14 produces steam 22 which flows to the injection well 16. Injection well 16 carries the steam 22 into a geologic formation 24 containing heavy oil, for example bitumen in the oil sands areas of Alberta, Canada. The steam 22 fluidizes bitumen in the formation 24 and later condenses. An oil and water mixture 26 is produced and withdrawn from the production well 18. The oil and water mixture 26 is sent to the oil-water separator 20. Product oil 28 is removed from the oil-water separator 20 for further refining. Produced water 30, which remains after the product oil 28 is removed from the oil and water mixture 26, flows to the water treatment system 10 for further treatment. The heavy oil recovery system 12 may be, for example, a steam assisted gravity drainage (SAGD) or cyclic steam stimulation (CSS) system.

The water treatment system 10 has a de-oiling unit 50, an evaporator 52, optionally a crystallizer 54, and a blowdown treatment system 56. The de-oiling unit 50 receives the produced water 30 and removes additional oil 51, for example emulsified oil, from the produced water 30 to produce de-oiled water 58. The de-oiling unit 50 may be, for example, a dissolved gas flotation unit, a walnut shell filtration unit, a de-oiling polymer mixing tank, a sorbent unit, a membrane filtration unit or another device. A suitable evaporator 52 and crystallizer 54 are available from GE Ionics, Inc.

De-oiled water 58 is treated further in the evaporator 52. Optionally, the de-oiled water 58 may pass through intermediate treatment steps on the way to evaporator 52. However, a warm lime softener is not required and is not provided in an embodiment.

Evaporator 52 may be, for example, a mechanical vapour recompression (MVC or MVR) evaporator. The evaporator 52 may use a falling film or other internal arrangement. The evaporator 52 may have associated equipment used, for example, to alter the pH of the de-oiled water or remove gasses or alkalinity from the de-oiled water 58. The evaporator 52 removes water vapour from the de-oiled water 58. The removed water vapour, when condensed, forms distillate 60 which is returned to the boiler 14 for re-use in the heavy oil recovery system 12, optionally after further treatment.

The evaporator 52 also has a brine recirculation loop 62. A seeding chemical 63 is added to the evaporator 52, for example by injection into the brine recirculation loop 62 as shown, the sump of the evaporator, a feed line to the evaporator or by other means. The seeding chemical 63 may be, for example, a magnesium oxide or calcium salt. The seeding chemical may be added in a dry form or in solution. A suitable magnesium salt is magnesium oxide. A suitable calcium salt is calcium sulfate (gypsum).

An evaporator blowdown 64 is withdrawn from the brine recirculation loop 62 and fed to the blowdown treatment system 56. Optionally, the blowdown treatment system 56 may be located within the brine recirculation loop 62. The evaporator blowdown 64, and the water in the brine circulation loop 62, have a high concentration of various contaminants that were present in the de-oiled water 58. In particular, the evaporator blowdown 64 and water in the brine circulation loop 62 have a high concentration of silica. The evaporator blowdown 64 is therefore not suitable for discharge in many locations. The use of a seeding chemical and a solvent (to be described below) may be particularly useful when the evaporator blowdown 64 or liquid in the brine recirculation loop 62 has a water soluble organics concentration (WSO) of 3 wt % or more and the WSO concentration is 20% or more of the total solids (TS) concentration. TS is measured by heating a sample to 105 degrees C. to remove water, then dividing the dry sample mass by the original sample mass. Total dissolved solids (TDS) is measured by heating a sample to 550 degrees C. to remove water and organics, then dividing the dry sample mass by the original sample mass. WSO is calculated as the difference between TS and TDS.

In the water treatment system 10, the evaporator blowdown 64 may be treated further in the optional crystallizer 54. Crystallizer 54 removes additional water vapour from the evaporator blowdown 64 which, when condensed, forms second distillate 66. Second distillate 66 may be returned to the boiler 14 for re-use in the heavy oil recovery system 12, optionally after further treatment.

The crystallizer 54 also produces a crystallizer blowdown 68. Crystallizer blowdown 68 has an even higher concentration of silica and other dissolved solids compared to the evaporator blowdown 64. Under some conditions, particularly when treating produced water 30 from a steam or water flood assisted oil recovery operation, the crystallizer 54 produces a crystallizer blowdown 68 in the form of a slurry having a high solids concentration. Silica and other dissolved solids are present in the slurry under super-saturated conditions but do not precipitate and settle from the slurry. For example, the crystallizer blowdown 68 may have a total solids (TS) content of 25 wt % or more or 50 wt % or more.

The evaporator 52 and crystallizer 54 are types of thermal treatment devices, alternatively called distillation devices. Optionally, alternative thermal treatment devices or concentrating devices, in one or more stages, may be used to create slurry similar to the crystallizer blowdown 68 or mixtures similar to evaporator blowdown 64 or water in the brine recirculation loop 62. Total organic carbon (TOC) in any of these mixtures 62, 64, 68 may be 2 wt % of more; total dissolved solids (TDS) may be 10 wt % or more; and, silica may be 1.5 wt % or more. Blowdown treatment system 56 may be located to receive crystallizer blowdown 68 as shown, to receive evaporator blowdown 64 without there being a crystallizer 54, or to be part of brine recirculation loop 62 in which case evaporator blowdown 64 stream may be omitted, or retained as a smaller system bleed with or without evaporator 54.

The blowdown treatment system 56 shown comprises a reaction vessel 70, a solvent dosing system 72 and a solvent recovery system 74. The crystallizer blowdown 68 (or evaporator blowdown 64 or recirculating brine 62) and solvent from the solvent dosing system 72 are added to the reaction vessel 70 and mixed together. The reaction vessel 70 may be, for example, a mixing tank or a conduit with in-line mixing. The solvent may pass through a heat exchanger 88 to solvent and thereby cool the crystallizer blowdown 68 (or evaporator blowdown 64 or recirculating brine 62) before it enters the reaction vessel 70 if required to maintain a temperature in the reaction vessel 70 below the boiling point of the solvent or to maintain a temperature at which the solvent and water are miscible. Precipitated solids 76 form, settle and are removed from the bottom of the reaction vessel 70, which acts as an integrated solid-liquid separation unit. Alternatively, the precipitated solids 76 may be removed by a separate solid-liquid separation unit such as a centrifuge, filter press, hydrocyclone, filter or clarifier. In a further alternative, solvent may be recovered from the crystallizer blowdown 68 (or evaporator blowdown 64 or recirculating brine 62) before or after the precipitated solids 76 are removed.

The solvent is added in a mass ratio of at least 1:1, or about 5:1 or more, solvent to crystallizer blowdown 68 (or evaporator blowdown 64 or recirculating brine 62).

The remaining blowdown-solvent mixture 78 is sent to the solvent recovery system 74. The solvent recovery system 74 may comprise a heated decanting vessel. In the case of DIPA, heating the blowdown-solvent mixture 78 to about 74 degrees C. causes the solvent to separate from the water and form a liquid solvent phase over the water. The solvent is decanted and drawn off from the top of the solvent recovery system 74. Alternatively, other solvents such as IPA, methanol or ethanol can be extracted from the blowdown-solvent mixture 78 by distillation. Other solvent extraction means may be appropriate for other solvents. Recovered solvent 80 is sent to the solvent dosing system 72 for re-use in the blowdown treatment system 56.

The precipitated solids 76 may include some organic compounds. The precipitated solids 76 may be treated to remove the organic compounds if required to meet discharge or disposal requirements relating to the precipitated solids. For example, the precipitated solids 76 may be dried, heated, exposed to UV radiation, exposed to microorganisms, embodied in cement, or washed with water, the solvent used in the solvent recovery system 74, or another solvent.

A waste brine 82 is also produced. In a case where the blowdown treatment system 56 is located within the brine recirculation loop 62, the waste brine 82 flows to the evaporator 52 to complete the brine recirculation loop 62. In other options, the waste brine 82 may be discharged or recycled to the water treatment system 10, for example by being sent back to the evaporator 52. Treatment unit 90 may extract remaining solvent or remove organic contaminants form the waste brine 82. Optionally, chemicals may be added to the waste brine 82 to oxidize remaining organic compounds. Alternatively, or additionally, the organic compounds may be digested biologically. In a further alternative, the organic compounds may be recovered for their value as industrial chemicals. The treated waste brine 82 may be returned to the water treatment system 10. However, in some cases the waste brine 82 is removed from the water treatment system 10, optionally after treating the waste brine 82 if required to meet any standards required for discharge or disposal. In this way, the waste brine 82 provides a bleed of water soluble organic compounds from the water treatment system 10 to inhibit the accumulation of any organic compounds that are not effectively removed by any process in the water treatment system 10.

This written description uses examples to disclose the invention and also to enable any person skilled in the art to practice the invention. The patentable scope of the invention is defined by the claims, and may include other examples that occur to those skilled in the art.

What is claimed is:
1. A process for extracting oil, the process comprising the steps of:
 a) producing steam;
 b) injecting the steam into a formation comprising oil;
 c) withdrawing a mixture of water and oil from the formation;
 d) separating produced water from the mixture of water and oil;
 e) treating the produced water at least in a seeded evaporator to produce a distillate and a blowdown;

f) using the distillate to produce additional steam for injection into the formation;
g) mixing a solvent with the blowdown;
h) after step g), separating precipitated solids comprising one or more salts from the blowdown; and
i) recovering at least some of the solvent from the mixture with the blowdown, and mixing recovered solvent with additional blowdown from the seeded evaporator.

2. The process of claim 1, wherein the oil is heavy oil or bitumen.

3. The process of claim 1, wherein steps a), b), and c) are part of a steam assisted gravity drainage (SAGD) or cyclic steam stimulation (CSS) operation.

4. The process claim 1, wherein step e) comprises treating the produced water with the seeded evaporator to produce an evaporator blowdown and treating the evaporator blowdown in a crystallizer to produce the blowdown.

5. The process of claim 1, wherein the solvent comprises Diisopropylamine (DIPA).

6. The process of claim 1, wherein the precipitated solids further comprise silica.

7. The process of claim 1, further comprising a step of removing the blowdown from the process after the steps of recovering solvent and separating precipitated solids.

8. The process of claim 1, further comprising treating organic compounds in the blowdown and returning treated blowdown to the process at or upstream of step e).

9. A method for treating a mixture having water, one or more salts in solution and one or more organic compounds, the method comprising the steps of,
a) treating the mixture in an evaporator to produce a concentrate;
b) adding a source of ions to the concentrate in the evaporator to form a seeded concentrate;
c) mixing the seeded concentrate with a solvent;
d) removing precipitates of the one or more salts and one or more organic compounds from the seeded concentrate; and
e) recovering at least some of the solvent from the mixture of concentrate and solvent.

10. The method of claim 9, further comprising a step of mixing recovered solvent with additional concentrate.

11. The method of claim 9, wherein the water comprises produced water.

12. The method of claim 11, wherein the produced water is extracted from a heavy oil containing formation after injecting steam into the formation.

13. The method of claim 9, wherein the concentrate comprises blowdown from two or more thermal treatment devices that include the evaporator.

14. The method of claim 13, wherein the thermal treatment devices comprise the evaporator and a crystallizer.

15. The method of claim 9, further comprising a step of treating at least some of the seeded concentrate after step d) to oxidize or remove organic compounds and returning the treated seeded concentrate to step a).

16. An apparatus for treating produced water, the apparatus comprising:
a) a seeded evaporator to treat the produced water and produce a blowdown stream;
b) a solvent mixing vessel, the solvent mixing vessel in communication with the blowdown stream;
c) a solvent feeding system in communication with the solvent mixing vessel;
d) a solid-liquid separation device; and
e) a solvent recovery system downstream of the solvent mixing vessel.

17. The apparatus of claim 16, wherein the solid-liquid separation device is incorporated with, or downstream of, the solvent mixing vessel.

18. The apparatus of claim 16, wherein the apparatus comprises two or more thermal treatment devices in series that includes the seeded evaporator.

19. The apparatus of claim 18, wherein the two or more thermal treatment devices comprise the evaporator and a crystallizer.

20. The apparatus of claim 16, further comprising a treatment system configured to oxidize or remove organic compounds downstream of the solvent recovery system.

21. A process for treating produced water from heavy oil extraction, the process comprising the steps of:
a) de-oiling the produced water;
b) treating the de-oiled produced water in a seeded evaporator to produce an evaporator blowdown;
c) adding a solvent to the blowdown;
d) separating solids from the blowdown; and
e) after step d), recovering solvent from the blowdown.

22. The process of claim 21, further comprising a step of treating the blowdown to remove or oxidize one or more organic compounds in the blowdown and returning treated blowdown to, or upstream of, step b).

* * * * *